US012266376B2

(12) United States Patent
Vilermo et al.

(10) Patent No.: US 12,266,376 B2
(45) Date of Patent: Apr. 1, 2025

(54) OBJECT AND AMBIENCE RELATIVE LEVEL CONTROL FOR RENDERING

(71) Applicant: Nokia Technologies Oy, Espoo (FI)

(72) Inventors: Miikka Tapani Vilermo, Siuro (FI); Roope Olavi Jarvinen, Lempaala (FI); Toni Henrik Makinen, Pirkkala (FI); Hannu Juhani Pulakka, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 254 days.

(21) Appl. No.: 17/993,071

(22) Filed: Nov. 23, 2022

(65) Prior Publication Data

US 2023/0169986 A1 Jun. 1, 2023

(30) Foreign Application Priority Data

Nov. 26, 2021 (GB) .................................... 2117067

(51) Int. Cl.
*G10L 21/02* (2013.01)
*G10L 25/18* (2013.01)

(52) U.S. Cl.
CPC .............. *G10L 21/02* (2013.01); *G10L 25/18* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 5,867,815 A * | 2/1999 | Kondo | G10L 21/0208 | 704/226 |
| 9,865,279 B2 * | 1/2018 | Amada | G10L 21/034 | |
| 11,457,326 B2 * | 9/2022 | Laitinen | H04R 1/406 | |
| 11,540,079 B2 * | 12/2022 | Terentiv | G10L 19/008 | |
| 2009/0245071 A1 * | 10/2009 | Uchida | G11B 7/0945 | |
| 2009/0245539 A1 * | 10/2009 | Vaudrey | H03G 7/002 | 381/109 |
| 2021/0120360 A1 * | 4/2021 | Terentiv | G10L 19/008 | |
| 2021/0360362 A1 * | 11/2021 | Laitinen | H04R 1/406 | |
| 2023/0169986 A1 * | 6/2023 | Vilermo | G10L 21/02 | 704/200 |

FOREIGN PATENT DOCUMENTS

| | | | |
|---|---|---|---|
| EP | 4187929 A1 * | 5/2023 | G10L 19/008 |
| GB | 2613185 A * | 5/2023 | G10L 19/008 |

* cited by examiner

*Primary Examiner* — Marcus T Riley
(74) *Attorney, Agent, or Firm* — McCarter & English LLP

(57) ABSTRACT

An apparatus including circuitry configured to: obtain an object track and an ambience track; obtain a control value configured to control the relative levels of the object track and the ambience track; estimate a leakage between the object track and the ambience track; determine at least one leakage level gain control value based on the control value and the leakage; and apply the at least one leakage level gain value to at least one of: the object track; and the ambience track, the application of the at least one leakage level gain value is such that a rendered audio signal is based on the application of the at least one leakage level gain control value to at least one of: the object track; and the ambience track.

20 Claims, 6 Drawing Sheets

OBJECT AND AMBIENCE RELATIVE LEVEL CONTROL FOR RENDERING

FIELD

The present application relates to apparatus and methods for object and ambience relative level control for rendering.

BACKGROUND

3GPP IVAS is expected to bring an object and ambience audio representation to mobile communications. Object audio signals are typically able to represent both a user's speech component and any ambience component within an audio scene around the capture device. This is significantly different from the previous generation devices and standards where the aim has been to attenuate any ambience component and focus only on the speech component.

It is realised that in order to produce life like representations of the audio scene the ambience components should be able to be reproduced. Furthermore, some users prefer being able to hear the ambience components in a call in order to experience the surroundings of the other party. However, some users may prefer the previous approach of attenuating the ambience audio components.

Hence there is a desire that users are given an opportunity to do both, typically as a user selectable preset that sets the default object and ambience level difference.

SUMMARY

There is provided according to a first aspect an apparatus comprising means configured to: obtain an object track and an ambience track; obtain a control value configured to control the relative levels of the object track and the ambience track; estimate a leakage between the object track and the ambience track; determine at least one leakage level gain control value based on the control value and the leakage; and apply the at least one leakage level gain value to at least one of: the object track; and the ambience track, the application of the at least one leakage level gain value is such that a rendered audio signal is based on the application of the at least one leakage level gain control value to at least one of: the object track; and the ambience track.

The control value may be configured to control one of: the relative levels of the object track and the ambience track; the level of the object track relative to the level of the ambience track; and the level of the ambience track relative to the level of the object track.

The object track may comprise an object audio signal and the ambience track may comprise an ambience audio signal.

The means may be configured to generate the rendered audio signal, the generated rendered audio signal may comprise at least one of: an audio signal based on the ambience audio signal and the at least one leakage level gain applied to the object audio signal; an audio signal based on the object audio signal and the at least one leakage level gain applied to the ambience audio signal; or an audio signal based on a first at least one leakage level gain applied to the object audio signal and a second at least one leakage level gain applied to the ambience audio signal.

The means configured to generate the rendered audio signal may be configured to output the rendered audio signal.

The means configured to obtain a control value configured to control the relative levels of the object track and the ambience track may be configured to: receive a user input comprising at least one of: an object track gain value; an ambience track gain value; an ambience track to object track gain value or an object track to ambience track gain value; determine a relative level value for audio signal reproduction comprising one or more of: an object track gain value; an ambience track gain value; an ambience track to object track gain value or an object track to ambience track gain value.

The means configured to estimate a leakage between the object track and the ambience track may be configured to determine one of: an amount of the energy of the object track is within the ambience track; an amount of the energy of the ambience track is within the object track; a correlation between the object track and the ambience track; and a correlation between the ambience track and the object track.

The object track may comprise an object metadata part defining at least one spatial parameter and the ambience track may comprise an ambience metadata part also defining at least one spatial parameter, wherein the means configured to estimate a leakage between the object track and the ambience track may be configured to determine a correlation between the at least one spatial parameter of the ambience metadata part and the at least one spatial parameter of the object metadata part.

The means configured to determine at least one leakage level gain control value based on the control value and the leakage may be configured to: determine a mapping function between the at least one leakage level gain control value and the control value, the mapping function being chosen based on the leakage; and apply the mapping to the control value to determine the at least one leakage level gain control value.

The means configured to determine at least one leakage level gain control value based on the control value and the leakage may be configured to determine a first leakage level gain value associated with the object track and a second leakage gain value associated with the ambience track, and the means configured to apply the at least one leakage level gain value to at least one of: the object track; and the ambience track may be configured to: apply the first leakage level gain value to the object track to generate a modified object track; and apply the second leakage level gain value to the ambience track to generate a modified ambience track.

The means may be further configured to combine the modified object track and the modified ambience track.

According to a second aspect there is provided a method comprising: obtaining an object track and an ambience track; obtaining a control value configured to control the relative levels of the object track and the ambience track; estimating a leakage between the object track and the ambience track; determining at least one leakage level gain control value based on the control value and the leakage; and applying the at least one leakage level gain value to at least one of: the object track; and the ambience track, the application of the at least one leakage level gain value is such that a rendered audio signal is based on the application of the at least one leakage level gain control value to at least one of: the object track; and the ambience track.

The control value may be configured to control one of: the relative levels of the object track and the ambience track; the level of the object track relative to the level of the ambience track; and the level of the ambience track relative to the level of the object track.

The object track may comprise an object audio signal and the ambience track may comprise an ambience audio signal.

The method may comprise generating the rendered audio signal, the generated rendered audio signal may comprise at least one of: an audio signal based on the ambience audio signal and the at least one leakage level gain applied to the object audio signal; an audio signal based on the object audio signal and the at least one leakage level gain applied to the ambience audio signal; or an audio signal based on a first at least one leakage level gain applied to the object audio signal and a second at least one leakage level gain applied to the ambience audio signal.

Generating the rendered audio signal may comprise outputting the rendered audio signal.

Obtaining a control value configured to control the relative levels of the object track and the ambience track may comprise: receiving a user input comprising at least one of: an object track gain value; an ambience track gain value; an ambience track to object track gain value or an object track to ambience track gain value; determining a relative level value for audio signal reproduction comprising one of: an object track gain value; an ambience track gain value; an ambience track to object track gain value or an object track to ambience track gain value.

Estimating a leakage between the object track and the ambience track may comprise determining one of: an amount of the energy of the object track is within the ambience track; an amount of the energy of the ambience track is within the object track; a correlation between the object track and the ambience track; and a correlation between the ambience track and the object track.

The object track may comprise an object metadata part defining at least one spatial parameter and the ambience track may comprise an ambience metadata part also defining at least one spatial parameter, wherein estimating a leakage between the object track and the ambience track may comprise determining a correlation between the at least one spatial parameter of the ambience metadata part and the at least one spatial parameter of the object metadata part.

Determining at least one leakage level gain control value based on the control value and the leakage may comprise: determining a mapping function between the at least one leakage level gain control value and the control value, the mapping function being chosen based on the leakage; and applying the mapping to the control value to determine the at least one leakage level gain control value.

Determining at least one leakage level gain control value based on the control value and the leakage may comprise determining a first leakage level gain value associated with the object track and a second leakage gain value associated with the ambience track, and applying the at least one leakage level gain value to at least one of: the object track; and the ambience track may comprise: applying the first leakage level gain value to the object track to generate a modified object track; and applying the second leakage level gain value to the ambience track to generate a modified ambience track.

The method may further comprise combining the modified object track and the modified ambience track.

According to a third aspect there is provided an apparatus comprising at least one processor and at least one memory including a computer program code, the at least one memory and the computer program code configured to, with the at least one processor, cause the apparatus at least to: obtain an object track and an ambience track; obtain a control value configured to control the relative levels of the object track and the ambience track; estimate a leakage between the object track and the ambience track; determine at least one leakage level gain control value based on the control value and the leakage; and apply the at least one leakage level gain value to at least one of: the object track; and the ambience track, the application of the at least one leakage level gain value is such that a rendered audio signal is based on the application of the at least one leakage level gain control value to at least one of: the object track; and the ambience track.

The control value may be configured to control one of: the relative levels of the object track and the ambience track; the level of the object track relative to the level of the ambience track; and the level of the ambience track relative to the level of the object track.

The object track may comprise an object audio signal and the ambience track may comprise an ambience audio signal.

The apparatus may be caused to generate the rendered audio signal, the generated rendered audio signal may comprise at least one of: an audio signal based on the ambience audio signal and the at least one leakage level gain applied to the object audio signal; an audio signal based on the object audio signal and the at least one leakage level gain applied to the ambience audio signal; or an audio signal based on a first at least one leakage level gain applied to the object audio signal and a second at least one leakage level gain applied to the ambience audio signal.

The apparatus configured to generate the rendered audio signal may be caused to output the rendered audio signal.

The apparatus configured to obtain a control value configured to control the relative levels of the object track and the ambience track may be caused to: receive a user input comprising at least one of: an object track gain value; an ambience track gain value; an ambience track to object track gain value or an object track to ambience track gain value; determine a relative level value for audio signal reproduction comprising one or more of: an object track gain value; an ambience track gain value; an ambience track to object track gain value or an object track to ambience track gain value.

The apparatus caused to estimate a leakage between the object track and the ambience track may be caused to determine one of: an amount of the energy of the object track is within the ambience track; an amount of the energy of the ambience track is within the object track; a correlation between the object track and the ambience track; and a correlation between the ambience track and the object track.

The object track may comprise an object metadata part defining at least one spatial parameter and the ambience track may comprise an ambience metadata part also defining at least one spatial parameter, wherein the apparatus caused to estimate a leakage between the object track and the ambience track may be caused to determine a correlation between the at least one spatial parameter of the ambience metadata part and the at least one spatial parameter of the object metadata part.

The apparatus caused to determine at least one leakage level gain control value based on the control value and the leakage may be caused to: determine a mapping function between the at least one leakage level gain control value and the control value, the mapping function being chosen based on the leakage; and apply the mapping to the control value to determine the at least one leakage level gain control value.

The apparatus caused to determine at least one leakage level gain control value based on the control value and the leakage may be caused to determine a first leakage level gain value associated with the object track and a second leakage gain value associated with the ambience track, and the apparatus caused to apply the at least one leakage level gain value to at least one of: the object track; and the ambience track may be caused to: apply the first leakage level gain value to the object track to generate a modified object track;

and apply the second leakage level gain value to the ambience track to generate a modified ambience track.

The apparatus may be further caused to combine the modified object track and the modified ambience track.

According to a fourth aspect there is provided an apparatus comprising: means for obtaining an object track and an ambience track; means for obtaining a control value configured to control the relative levels of the object track and the ambience track; means for estimating a leakage between the object track and the ambience track; means for determining at least one leakage level gain control value based on the control value and the leakage; and means for applying the at least one leakage level gain value to at least one of: the object track; and the ambience track, the application of the at least one leakage level gain value is such that a rendered audio signal is based on the application of the at least one leakage level gain control value to at least one of: the object track; and the ambience track.

According to a fifth aspect there is provided a computer program comprising instructions [or a computer readable medium comprising program instructions] for causing an apparatus to perform at least the following: obtain an object track and an ambience track; obtain a control value configured to control the relative levels of the object track and the ambience track; estimate a leakage between the object track and the ambience track; determine at least one leakage level gain control value based on the control value and the leakage; and apply the at least one leakage level gain value to at least one of: the object track; and the ambience track, the application of the at least one leakage level gain value is such that a rendered audio signal is based on the application of the at least one leakage level gain control value to at least one of: the object track; and the ambience track.

According to a sixth aspect there is provided a non-transitory computer readable medium comprising program instructions for causing an apparatus to perform at least the following: obtain an object track and an ambience track; obtain a control value configured to control the relative levels of the object track and the ambience track; estimate a leakage between the object track and the ambience track; determine at least one leakage level gain control value based on the control value and the leakage; and apply the at least one leakage level gain value to at least one of: the object track; and the ambience track, the application of the at least one leakage level gain value is such that a rendered audio signal is based on the application of the at least one leakage level gain control value to at least one of: the object track; and the ambience track.

According to a seventh aspect there is provided an apparatus comprising: obtaining circuitry configured to obtain an object track and an ambience track; obtaining circuitry configured to obtain a control value configured to control the relative levels of the object track and the ambience track; estimating circuitry configured to estimate a leakage between the object track and the ambience track; determining circuitry configured to determine at least one leakage level gain control value based on the control value and the leakage; and applying circuitry configured to apply the at least one leakage level gain value to at least one of: the object track; and the ambience track, the application of the at least one leakage level gain value is such that a rendered audio signal is based on the application of the at least one leakage level gain control value to at least one of: the object track; and the ambience track.

According to an eighth aspect there is provided a computer readable medium comprising program instructions for causing an apparatus to perform at least the following: obtain an object track and an ambience track;

- obtain a control value configured to control the relative levels of the object track and the ambience track;
- estimate a leakage between the object track and the ambience track;
- determine at least one leakage level gain control value based on the control value and the leakage; and
- apply the at least one leakage level gain value to at least one of: the object track; and the ambience track, the application of the at least one leakage level gain value is such that a rendered audio signal is based on the application of the at least one leakage level gain control value to at least one of: the object track; and the ambience track.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1B:
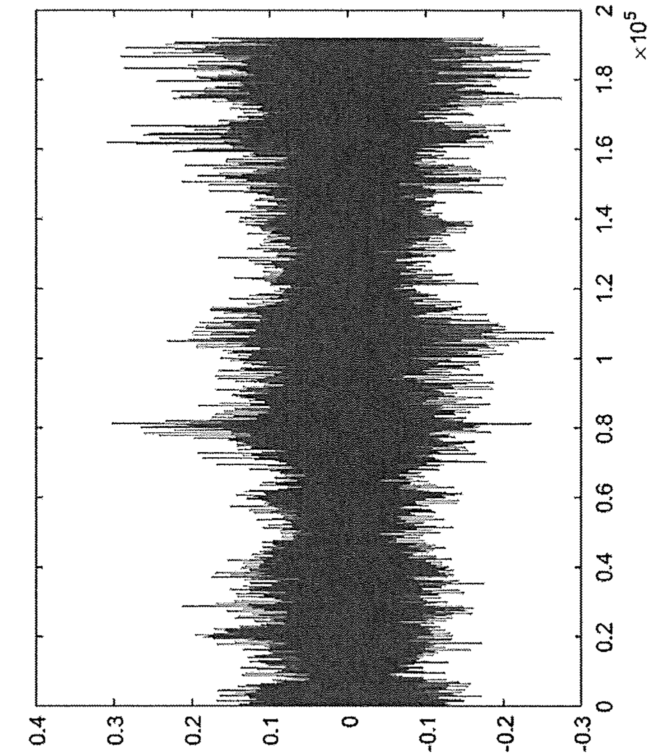
FIGS. 1*a* and 1*b* show graph plots of example normalised object audio and one channel of ambience audio respectively.

As discussed above one of the challenges that arises from an object and ambience component based captured audio scene is one of being able to enable user selection of ambience reproduction or ambience suppression.

The embodiments as discussed herein aim to overcome the problem of that depending on the capture device (microphone number, locations, software, recording conditions etc.) the object and ambience signals may not be fully separate and parts of the object signal (user speech) may leak to the ambience signal (other sounds) and vice versa. Thus, for example where a user has selected that an ambience signal should always be 6 dB below the object signal, when there is leakage between the ambience and object components present, a simple gain setting of 0.5 (~−6 dB) to the ambience signal no longer achieves the desired gain or suppression.

Conventionally, object and ambient audio signal relative levels would be set as follows. Both signals are normalized (to max amplitude, same energy or power etc.) and then if user has desired that ambience is 6 dB below object audio level, then ambience would be multiplied by 10^(−6/20) =0.5.

This works if both object and ambience signals are separate i.e. there is no leakage. However, it fails where there is leakage. For example, where the object audio signal is 75% user voice and 25% other sounds and ambience signal is 75% other sounds and 25% user voice, that is, there is 25% leakage from both signals. Furthermore, in this example both signals are normalized to same power. Applying the 0.5 gain to the ambience and combining the resulting signal (in typical playback both signals are played at equal volume and their levels can approximately be estimated to combine) has 0.75+0.5*0.25 user voice and 0.25+0.5*0.75 other sounds. In other words, the contributions after the gain has been applied is 0.875 user voice and 0.625 other sounds. The 0.625 component is therefore nowhere near the half of 0.875 component that the user selected.

Thus, embodiments as discussed herein describe apparatus and methods which aim to improve the setting of the relative levels of object and ambient components of audio signals according to user preference even when the object signal and/or the ambient signal has leaked to the other signal.

In some embodiments the setting of the relative levels is implemented by analysing the amount of leakage using correlation and/or metadata about the audio signals and using the analysis result to modify the gain value of at least one of the signals.

In some embodiments this is implemented within a device that plays back object and ambient audio and sets their relative level difference based on a user preference using a gain on at least one of the signals. The device in some embodiments is configured to estimate leakage between the object and ambient audio signals using correlation and/or metadata analysis and the device uses the correlation estimate when setting the gain.

In some embodiments an apparatus or device (user) is configured to receive an IVAS call. The IVAS call can comprise an object and an ambience track. In the following examples the term track would be understood to be synonymous with signal. For example, an ambience track would be understood to be an ambience (audio) signal, and an object track an object (audio) signal.

Furthermore, in some embodiments the apparatus or device (user) is configured to set (or have set) a desired component ratio or relative component composition. For example, the device can be configured to have a setting that the amplitude of the ambience tracks compared to the object track is for example 0.5. The setting can be any suitable expression of the relative components. For example, in some embodiments a user may control a user input configured to set the desired difference in decibels, using a visual scale, numerically from a keypad, using a sensor, control knob etc. The device may further control (and in some embodiments this control can also be set by a user operating a user interface) separate object and ambience levels and from these separate level settings a difference is determined which can be calculated.

As previously mentioned there can be reasons (such as leakage) where the end result is not the desired setting when the (user set) ambience amplitude is directly used as a gain for the ambience track in an IVAS call. Therefore, in the embodiments as discussed herein a different gain (or a modified gain) is determined that achieves the desired setting or control as much as possible.

In the following examples it is assumed that leakage between the object and ambience is symmetrical (in that the leakage goes both ways) and can be formulated as:

$$\text{Object}=(1-\text{leakage})*\text{RealObject}+\text{leakage}*\text{RealAmbience}$$

$$\text{Ambience}=(1-\text{leakage})*\text{RealAmbience}+\text{leakage}*\text{RealObject},$$

where RealObject and RealAmbience are the amplitudes of the real object and ambience signals respectively. The IVAS object and ambience channel amplitudes are Object and Ambience and generated by the device or apparatus that created the IVAS signals.

Figure 1A:
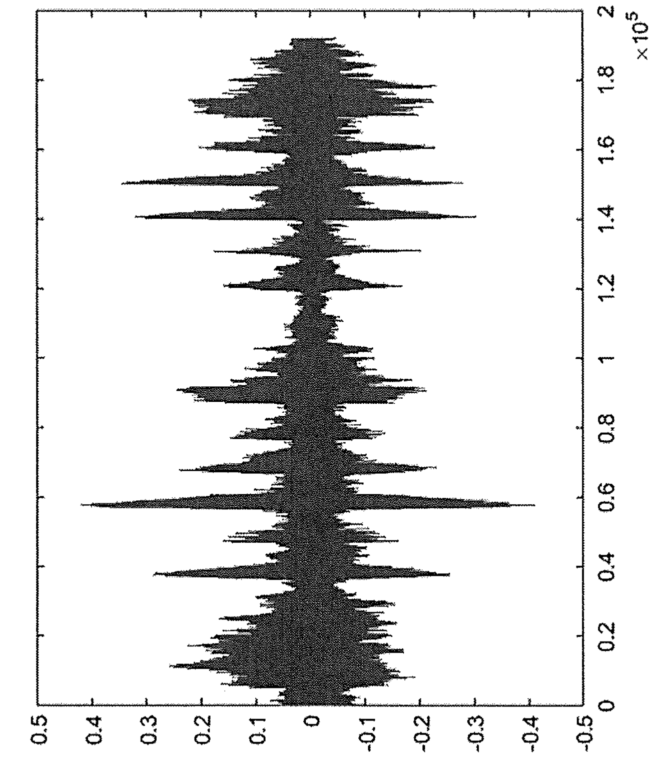

With respect to FIG. 1*a* is shown a graph of an example object audio normalized between −0.4 and 0.4 and FIG. 1*b* is shown a graph of an example one channel of ambience data also normalized between −0.4 and 0.4.

Figure 2:
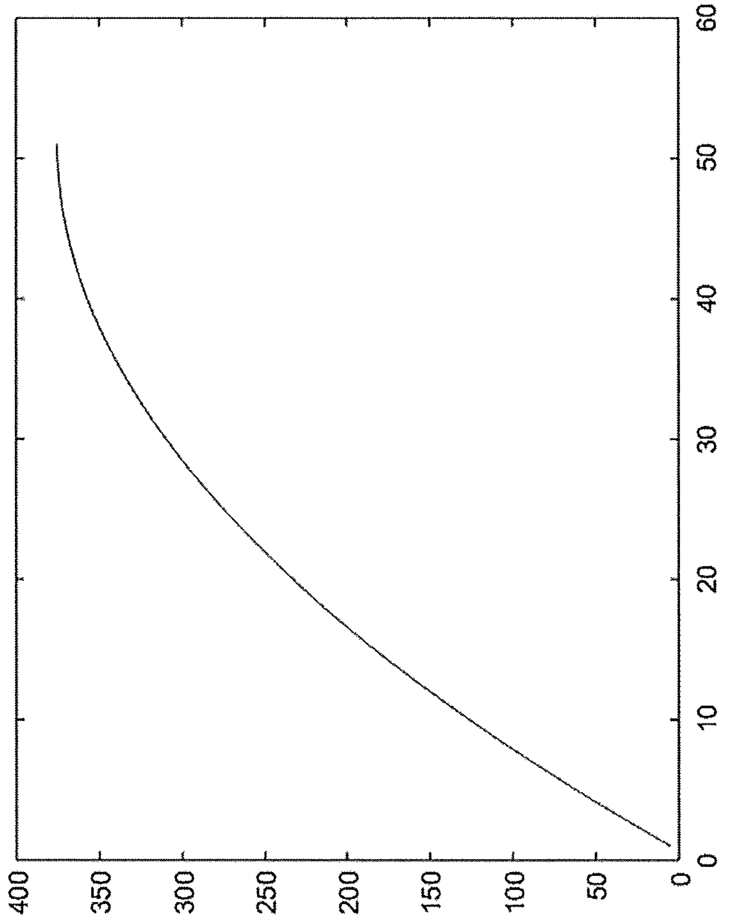
FIG. 2 show a graph plot of leakage against cross-correlation.

In some embodiments an estimate of the amount of leakage can be determined by calculating a cross correlation (xcorr) between the ambience and object channels. In some embodiments this estimation can be implemented using metadata and is detailed later. Cross correlation values depend on the scaling used for the digital signals and the length of the frame that is used for calculation. An example of a relationship between the cross-correlation and leakage is shown in FIG. 2 where y-axis shows the cross correlation and the x-axis the leakage in % terms.

In some embodiments the cross correlation is calculated for different levels of leakage.

The cross correlation (xcorr) value can thus be used, in some embodiments, as an estimate of leakage. For example, the relationship shown in FIG. 2 can be simplified or modelled as:

$$\text{leakage}=\frac{\min(xcorr,\ 350)}{7}$$

where the number 7 is an experimental value that approximately fits a line to describe the relationship between the cross correlation and amount of leakage. A line is good enough here because the relationship is dependent on the two signals and the relationship is only an estimate (although a useful estimate).

As such it is possible to obtain or receive IVAS object and ambience tracks and calculate the cross correlation between at least one channel of object and ambience tracks, estimate the leakage from the calculation and use the estimated leakage to modify at least ambience signal gain to achieve user desired level difference between the object and ambience tracks.

Thus, for example in some embodiments when x is the actual needed gain for ambience then it is possible to determine the following:

$$\text{UserPreference} = \frac{x*(1-\text{leakage})*\text{RealAmbience}+\text{leakage}*\text{RealAmbience}}{(1-\text{leakage})*\text{RealObject}+x*\text{leakage}*\text{RealObject}},$$

where UserPreference is the user desired gain. In this formulation it is assumed that the part of the RealObject signal that is played in the object track of the IVAS signal sums with the part of the RealObject that leaked into the ambience track of the IVAS signal. This is not always the case but as an approximation this typically is a correct assumption. The same assumption is made for the RealAmbience part.

As it is not possible to directly estimate the amplitude of the RealObject and RealAmbience signals, instead in some embodiments the formulation is modified to arrive at a method where we can use the amplitudes of the object and ambience tracks and the estimated leakage.

As such, in some embodiments, the determination of x can be:

$$x = \frac{\text{UserPreference}*(1-\text{leakage})*\text{RealObject}-\text{leakage}*\text{RealAmbience}}{(1-\text{leakage})*\text{RealAmbience}-\text{UserPreference}*\text{leakage}*\text{RealObject}}, \text{ where}$$

$$\text{RealObject} = \frac{\text{Ambience}*\text{leakage}+\text{Object}*\text{leakage}-\text{Object}}{2*\text{leakage}-1}$$

$$\text{RealAmbience} = \frac{\text{Ambience}*\text{leakage}+\text{Object}*\text{leakage}-\text{Ambience}}{2*\text{leakage}-1}$$

Thus, in some embodiments there is determined a gain needed for the ambience to fulfil the desired level of ambience (with respect to the object signal).

Figure 3:
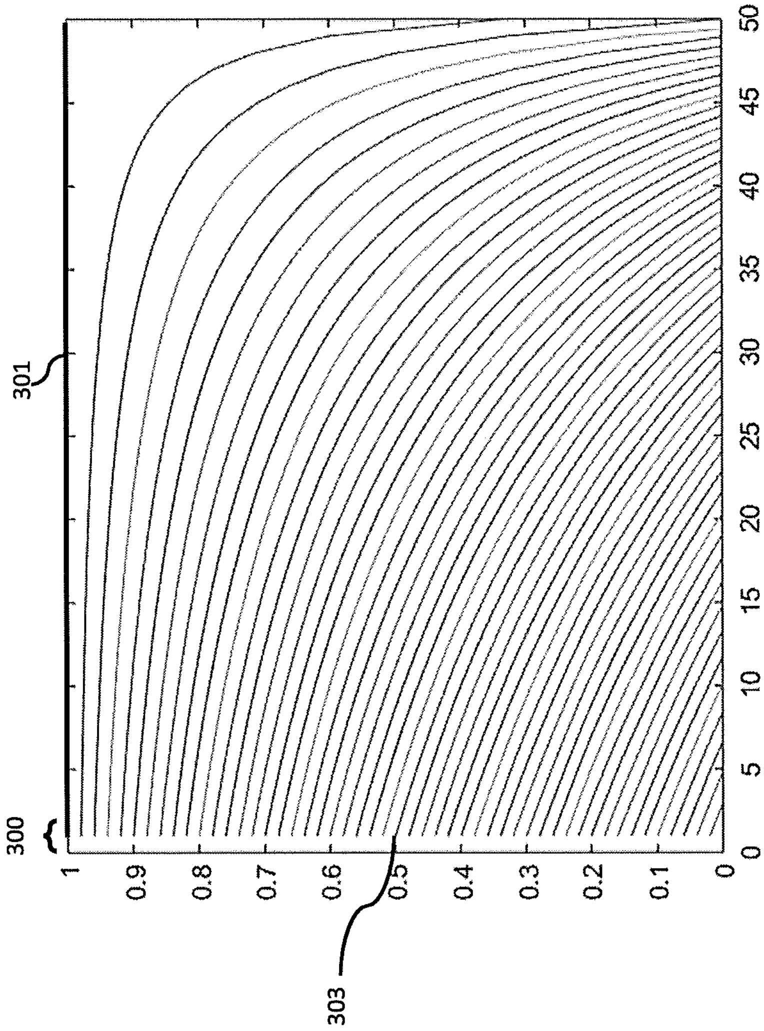
FIG. 3 shows graph plots of actual ambience gain needed to fulfill user desired gain where for different levels of leakage against user desired gain and actual gain needed, following coloured curve that is at the user desired gain at x=0 to the point where leakage level is as measured)

With respect to FIG. 3 is shown a graph of an estimated actual ambience gain needed to fulfill user desired gain. The different levels of leakage are shown on the x-axis in % and the user desired gain is shown on the y-axis at x=0 position and the actual gain needed where curve is followed that is at the user desired gain at x=0 to the point where leakage level is measured.

Thus, as can be shown from FIGS. 2 and 3 when there is no leakage (x=0), the actual needed gain is the same as user desired gain—shown by reference 300 on FIG. 3. Also, when user desires that ambience is at the same level as object (y=1) reference 301 on FIG. 3, the actual gain is also always 1 regardless of the amount of leakage. Furthermore, when there is a desired ambience of half the amplitude of object (the curve 303 starting at [0 0.5] and ending at [34 0]), this desire can be fulfilled when leakage is between 0 and 34% but for higher values of leakage the user desire cannot be filled since negative gain values are not practically possible.

Thus, the user/desired preference in some cannot be always guaranteed if the leakage is too high in which case the apparatus can be configured to limit the values of x as follows: x=max(x, 0).

In some embodiments the user preference can be a fixed setting or a variable or dynamic control which the user is configured to control from a slider (or similar) on a user interface.

Figure 4:
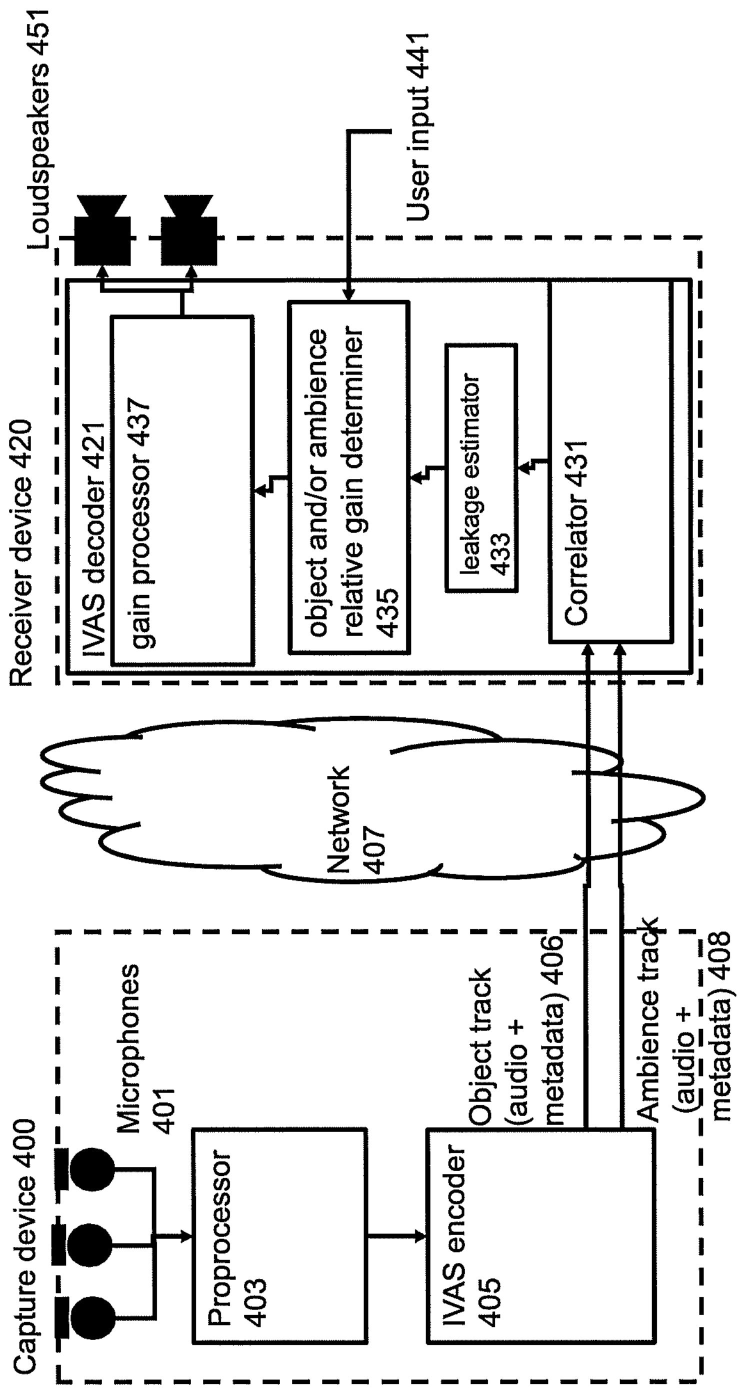
FIG. 4 shows schematically apparatus suitable for implementing some embodiments.

With respect to FIG. 4 is shown an example system of apparatus within which some embodiments could be implemented.

The example system of apparatus, in some embodiments, comprises a capture device 400. The capture device can, in some embodiments, comprise a microphone array (or multiple microphones) 401 which are configured to capture the audio scene.

The microphone array audio signals can, in some embodiments, be passed to a preprocessor 403. The preprocessor 403 in some embodiments is configured to implement any suitable pre-processing operation and generate audio signals suitable for passing to a IVAS encoder 405.

The capture device 400 furthermore in some embodiments comprises an IVAS encoder 405 which obtains the processed audio signals from the pre-processor and is configured to generate a object track (comprising audio and metadata) 406 and an ambience track (comprising audio and metadata) 408 which can be passed via the network 407 to a receiver device 420.

In the example shown in FIG. 4 the receiver device 420 comprises an IVAS decoder 421. The IVAS decoder 421 in this example is configured to receive or obtain the object track (comprising audio and metadata) 406 and the ambience track (comprising audio and metadata) 408 which can be received via the network 407 (or in some embodiments recovered from local storage or memory).

The IVAS decoder 421 in some embodiments comprises a correlator 431. The correlator 431 in some embodiments is configured to receive the audio signals associated with the object track and the ambience track and determine a cross correlation between them. This cross correlation determination can then be passed to a leakage estimator 433.

The IVAS decoder 421 in some embodiments comprises a leakage estimator 433. The leakage estimator 433 is configured to obtain the cross correlation values and based on this estimate the leakage between the two channels. The leakage estimate can be implemented using the model as described above or based on any suitable modelling relationship between the cross correlation and the leakage. The leakage estimate can then be passed to the object and/or ambience relative gain determiner 435.

The IVAS decoder 421 in some embodiments comprises an object and/or ambience relative gain determiner 435 can be configured to obtain or receive the leakage estimate and the user input 441 providing the desired ratio or level associated with the object and/or ambience signals. The object and/or ambience relative gain determiner 435 can in some embodiments be configured to generate at least one gain value based on the desired ratio or level input and the leakage estimate. This can be determined using the formula as discussed above or any suitable mapping, for example implemented as a look up table where the leakage value and the desired ratio or level input value is used as inputs and a gain value to be applied to one or other (or gains to be applied to both) of the object channel audio signal and ambience channel audio signal. The gain or gain values can then be passed to the gain processor 437.

The IVAS decoder 421 in some embodiments comprises a gain processor 437. The gain processor 437 is configured to apply the determined gain or gain values to the channel audio signals.

The IVAS encoder and decoder and the devices can furthermore contain many other parts that are not shown here because they are known from prior art and are not relevant for this invention. For example, the rendering of the ambience and object tracks into a format that is suitable for user listening (5.1 for home theatre, binaural for headphones, stereo for speakers, mono for a speaker etc.). In the example shown in FIG. 4 there are shown loudspeakers 451 for outputting the audio signals but any other suitable means can be employed in some embodiments. Furthermore, some of the processing discussed herein may occur inside the IVAS decoder or outside the decoder in some embodiments.

The leakage estimation and gain modification may also occur on the capture device side although in this case either the user preference needs to be transmitted there or there needs to be a global fixed preference.

In the example herein the leakage is estimated based on a cross correlation estimate but in some embodiments IVAS metadata, which includes values like direction, energy ratios (direct-to-ambience ratio i.e. D/A ratio) can be used. If the metadata is very similar between the object and ambience tracks, then the leakage is high and vice versa. The device that receives IVAS signal can thus in some embodiments be configured to calculate a correlation or a difference signal between the metadata values and employ a suitable mapping from the correlation or difference to leakage values. The mapping can be created using test signals where the leakage is known. When a mapping from metadata to leakage exists then the rest of the processing is the same as in the case above with correlation between signals themselves.

In some embodiments it is also possible to employ a combined correlation of audio and metadata by calculating correlation between audio tracks and metadata and combining the correlation by taking the average, max, min etc.

Figure 5:
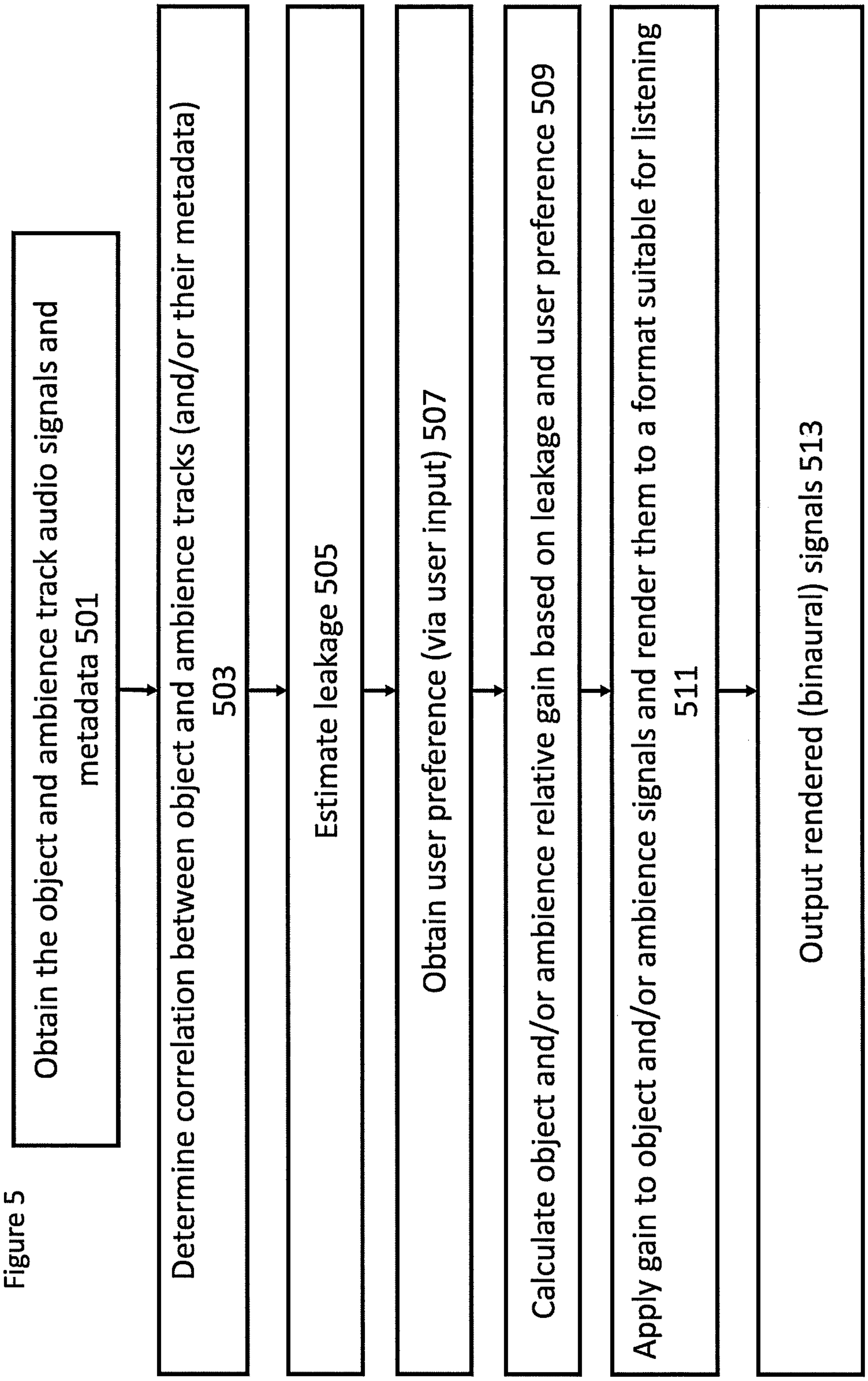
FIG. 5 shows a flow diagram of an example operation of the decoder as shown in FIG. 4 according to some embodiments.

With respect to FIG. 5 is shown example operations of the receiver device as shown in FIG. 4 according to some embodiments.

The first operation can be to obtain the object and ambience track audio signals and metadata as shown in FIG. 5 by step 501.

Then having obtained the tracks, determine correlation between object and ambience tracks (and/or their metadata) as shown in FIG. 5 by step 503.

Then estimate leakage based on the correlation as shown in FIG. 5 by step 505.

Also the method comprises obtaining user preference (via user input) as shown in FIG. 5 by step 507.

Having estimated the leakage and obtaining the user preference this can be used to calculate object and/or ambience relative gain based on leakage and user preference as shown in FIG. 5 by step 509.

Then apply the determined gain to object and/or ambience signals and render them to a format suitable for listening as shown in FIG. 5 by step 511.

Finally, the rendered audio signals are output as shown in FIG. 5 by step 513.

Figure 6:
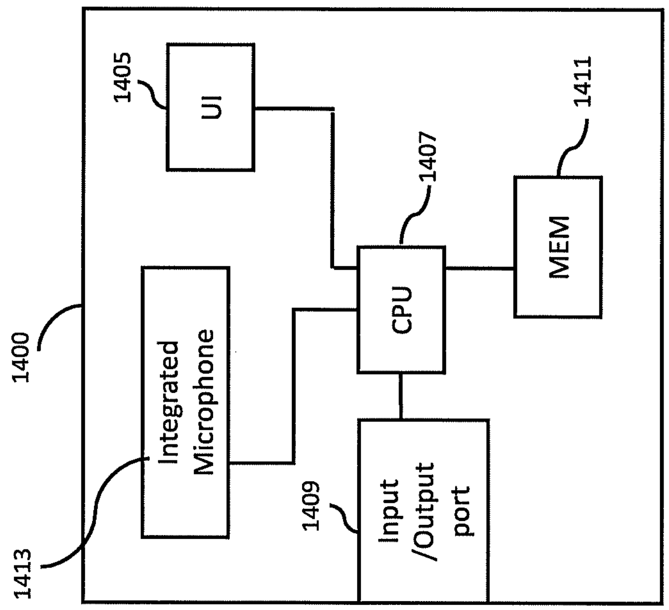
FIG. 6 shows a schematic view of an implementation of the microphone within a suitable device according to some embodiments.

With respect to FIG. 6 an example electronic device which may be used as any of the apparatus parts of the system as described above. The device may be any suitable electronics device or apparatus. For example, in some embodiments the device 1400 is a mobile device, user equipment, tablet computer, computer, audio playback apparatus, etc. The device may for example be configured to implement the encoder or the renderer or any functional block as described above.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 2005 may be the user interface for communicating.

In some embodiments the device 1400 comprises an input/output port 1409. The input/output port 1409 in some embodiments comprises a transceiver. The transceiver in such embodiments can be coupled to the processor 2007 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The input/output port 2009 may be configured to receive the signals.

In some embodiments the device 1400 may be employed as at least part of the capture or receiver device. The input/output port 1409 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
at least one processor; and
at least one memory storing instructions that, when executed with the at least one processor, cause the apparatus to:
obtain an object track and an ambience track;
obtain a control value configured to control relative levels of the object track and the ambience track;
estimate a leakage between the object track and the ambience track;
determine at least one leakage level gain control value based on the control value and the leakage; and
apply the at least one leakage level gain control value to at least one of: the object track; or the ambience track, where the application of the at least one leakage level gain control value is such that a rendered audio signal is based on the application of the at least one leakage level gain control value to at least one of: the object track; or the ambience track.

2. The apparatus as claimed in claim 1, wherein the control value is configured to control the relative levels of the object track and the ambience track comprising one of:
the level of the object track relative to the level of the ambience track; or
the level of the ambience track relative to the level of the object track.

3. The apparatus as claimed in claim 1, wherein the object track comprises an object audio signal and the ambience track comprises an ambience audio signal.

4. The apparatus as claimed in claim 3, wherein the instructions, when executed with the at least one processor, cause the apparatus to generate the rendered audio signal, where the generated rendered audio signal comprises at least one of:
an audio signal based on the ambience audio signal and the at least one leakage level gain control value applied to the object audio signal;
an audio signal based on the object audio signal and the at least one leakage level gain control value applied to the ambience audio signal; or
an audio signal based on a first at least one leakage level gain control value applied to the object audio signal and a second at least one leakage level gain control value applied to the ambience audio signal.

5. The apparatus as claimed in claim 4, wherein the instructions, when executed with the at least one processor, cause the apparatus to output the rendered audio signal.

6. The apparatus as claimed in claim 1, wherein the instructions, when executed with the at least one processor, cause the apparatus to:
receive a user input comprising at least one of: an object track gain value; an ambience track gain value; an ambience track to object track gain value; or an object track to ambience track gain value; and
determine a relative level value for audio signal reproduction comprising one or more of: the object track gain value; the ambience track gain value; the ambience track to object track gain value or the object track to ambience track gain value.

7. The apparatus as claimed in claim 1, wherein the instructions, when executed with the at least one processor, cause the apparatus to determine one of:
an amount of energy of the object track is within the ambience track;
an amount of energy of the ambience track is within the object track;
a correlation between the object track and the ambience track; or
a correlation between the ambience track and the object track.

8. The apparatus as claimed in claim 1, wherein the object track comprises an object metadata part defining at least one spatial parameter and the ambience track comprises an ambience metadata part defining at least one spatial parameter, wherein the instructions, when executed with the at least one processor, cause the apparatus to determine a correlation between the at least one spatial parameter of the ambience metadata part and the at least one spatial parameter of the object metadata part.

9. The apparatus as claimed in claim 1, wherein the instructions, when executed with the at least one processor, cause the apparatus to:

determine a mapping between the at least one leakage level gain control value and the control value based on the leakage; and apply the mapping to the control value to determine the at least one leakage level gain control value.

10. The apparatus as claimed in claim 1, wherein the instructions, when executed with the at least one processor, cause the apparatus to determine a first leakage level gain control value associated with the object track and a second leakage gain control value associated with the ambience track, and further causes the apparatus to:

apply the first leakage level gain control value to the object track to generate a modified object track; and apply the second leakage level gain control value to the ambience track to generate a modified ambience track.

11. The apparatus as claimed in claim 10, wherein the instructions, when executed with the at least one processor, cause the apparatus to combine the modified object track and the modified ambience track.

12. A method comprising:

obtaining an object track and an ambience track;

obtaining a control value configured to control relative levels of the object track and the ambience track;

estimating a leakage between the object track and the ambience track;

determining at least one leakage level gain control value based on the control value and the leakage; and applying the at least one leakage level gain control value to at least one of: the object track; or the ambience track, where the application of the at least one leakage level gain control value is such that a rendered audio signal is based on the application of the at least one leakage level gain control value to at least one of: the object track; or the ambience track.

13. The method as claimed in claim 12, wherein the control value is configured to control one of:

the relative levels of the object track and the ambience track;

the level of the object track relative to the level of the ambience track; or a level of the ambience track relative to the level of the object track.

14. The method as claimed in claim 12, wherein the object track comprises an object audio signal and the ambience track comprises an ambience audio signal.

15. The method as claimed in claim 14, wherein the method comprises generating the rendered audio signal, the generated rendered audio signal comprises at least one of:

an audio signal based on the ambience audio signal and the at least one leakage level gain control value applied to the object audio signal;

an audio signal based on the object audio signal and the at least one leakage level gain control value applied to the ambience audio signal; or an audio signal based on a first at least one leakage level gain control value applied to the object audio signal and a second at least one leakage level gain applied to the ambience audio signal.

16. The method as claimed in claim 12, wherein controlling the relative levels of the object track and the ambience track comprises:

receiving a user input comprising at least one of: an object track gain value; an ambience track gain value; an ambience track to object track gain value; or an object track to ambience track gain value; and determining a relative level value for audio signal reproduction comprising one or more of: the object track gain value; the ambience track gain value; the ambience track to object track gain value; or the object track to ambience track gain value.

17. The method as claimed in claim 12, wherein estimating the leakage between the object track and the ambience track comprises determining one of:

an amount of energy of the object track is within the ambience track;

an amount of energy of the ambience track is within the object track;

a correlation between the object track and the ambience track; or a correlation between the ambience track and the object track.

18. The method as claimed in claim 12, wherein the object track comprises an object metadata part defining at least one spatial parameter and the ambience track comprises an ambience metadata part defining at least one spatial parameter, wherein the method comprises estimating the leakage between the object track and the ambience track comprises determining a correlation between the at least one spatial parameter of the ambience metadata part and the at least one spatial parameter of the object metadata part.

19. The method as claimed in claim 12, wherein determining the at least one leakage level gain control value comprises:

determining a mapping between the at least one leakage level gain control value and the control value based on the leakage; and applying the mapping to the control value to determine the at least one leakage level gain control value.

20. The method as claimed in claim 12, wherein the method comprises determining the at least one leakage level gain control value comprises determining a first leakage level gain control value associated with the object track and a second leakage gain control value associated with the ambience track, and the method comprises applying the at least one leakage level gain control value to at least one of: the object track; or the ambience track further comprises:

applying the first leakage level gain control value to the object track to generate a modified object track; and applying the second leakage level gain control value to the ambience track to generate a modified ambience track.

* * * * *